Dec. 18, 1962  J. B. ROBINSON  3,068,634
NUT GATHERER
Filed Feb. 13, 1962
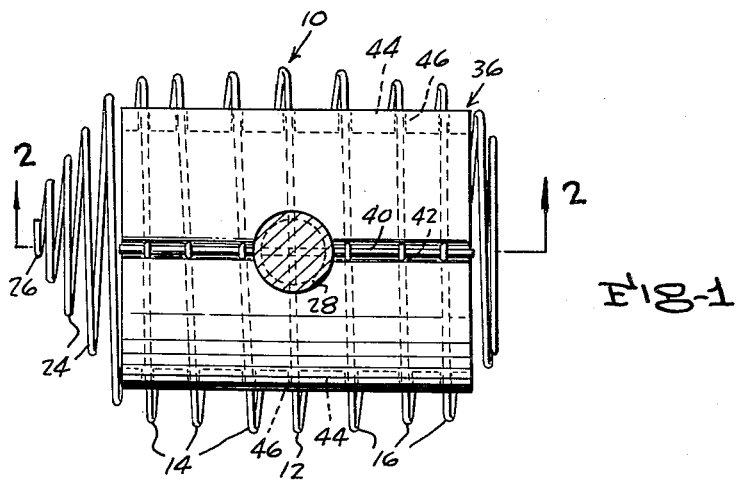
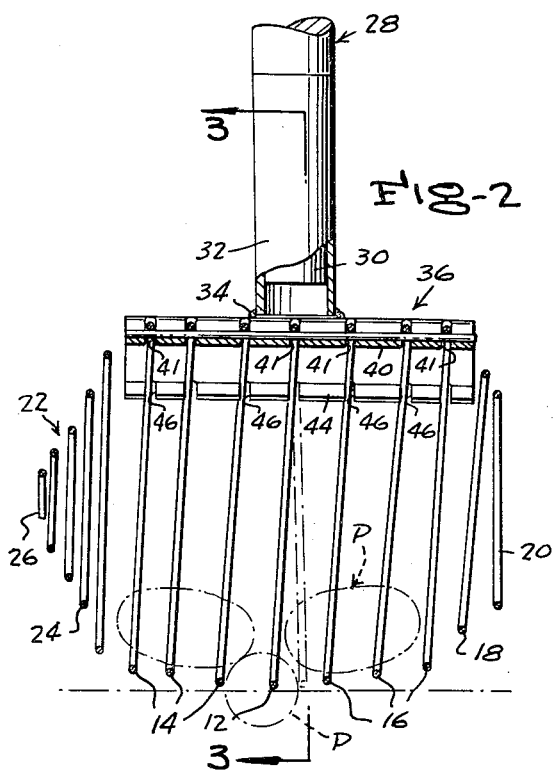
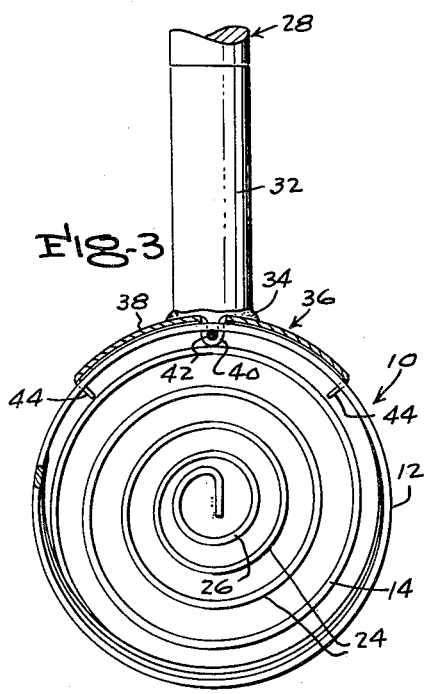
INVENTOR.
JOHN B. ROBINSON
BY
McMorrow, Berman & Davidson
ATTORNEYS

United States Patent Office 3,068,634
Patented Dec. 18, 1962

3,068,634
NUT GATHERER
John B. Robinson, P.O. Box 297, Foley, Ala.
Filed Feb. 13, 1962, Ser. No. 172,993
7 Claims. (Cl. 56—328)

This invention relates to a novel nut gatherer, especially but not necessarily for picking up and retaining pecans.

The primary object of the invention is the provision of a mechanically and functionally superior device of the kind indicated, which reduces the amount of effort and skill required for picking up nuts from uneven and littered ground, and which enables a picker to easily and quickly pick up nuts, in an erect position, with the device either normal to or angled with respect to the ground.

Another object of the invention is the provision of a simpler, and sturdier device of the character indicated above, which is composed of a small number of simple and easily assembled parts, and which can be manufactured in well-finished and serviceable forms, at relatively low cost.

Other important objects and advantages features of the invention will be apparent from the following description and the accompanying drawings, wherein, for purposes of illustration only, a specific form of the invention is set forth in detail.

In the drawings:

FIGURE 1 is a top plan view of a device of the present invention, a portion being in section;

FIGURE 2 is a vertical longitudinal section taken on the line 2—2 of FIGURE 1; and FIGURE 3 is a vertical transverse section taken on the line 3—3 of FIGURE 2.

Referring in detail to the drawings, wherein like numerals designate like parts throughout the several views, the illustrated device comprises a longitudinally elongated basket 10 of hollow cylindrical form, which is comprised of a single spring wire spiral, having a middle convolution 12 of maximum diameter, and intermediate convolutions 14 and 16, at opposite sides of the middle convolution, which are of outwardly progressive decreasing diameters.

The outer one of the convolutions 16 merges into a substantially smaller convolution 18, which merges into a final convolution 20, smaller in diameter than the outer convolution, which defines the discharge opening for the basket.

The outer one of the intermediate convolutions 14 merges into a helical cone 22 of convolutions 24 of sharply and progressively outwardly diminishing diameters, the final convolution 26 of which is smaller in diameter than a nut, such as a pecan P to be handled. The cone 22 constitutes the closed end of the cage 10.

The convolutions of the cone 22 are relatively closely spaced from each other, and preclude any passage of nuts therebetween. The intermediate convolutions 14 and 16 and the middle convolution 12 are spaced at substantially uniform distances from each, less than the diameter of nuts to be picked up, but great enough that when adjacent ones of these convolutions are pressed downwardly upon a nut lying on the ground, these adjacent convolutions will be spread away from each other and pass the nut into the basket 10, to be carried therein, until deliberately discharged through the open end of the basket.

While, as shown in FIGURE 2, the tops of the middle and intermediate convolutions of the basket 10 are on the same horizontal level, the bottoms of these convolutions, due to their differences in diameter, are on progressively greater levels, above the middle convolution 12, so that, in effect, the bottom of the basket 10 is upwardly tapered or angled from the middle convolution 12 to the ends of the basket. This arrangement has been provided in order to make possible and to facilitate the picking up of nuts with the basket disposed at convenient angles to the longitudinal axis, instead of having to be laboriously confined to having to be held by the operator parallel with the ground. Further, the circular cross section of the basket 10 enables the same to be applied to pick up nuts with the basket in any of a plurality of rotated positions, relative to the ground, and to the perpendicular, instead of having to be laboriously confined to an erect position.

The illustrated device further comprises an elongated handle bar 28, long enough to extend from the hands of an operator standing in an erect position, for reaching the basket 10 to and manipulating the same on the ground. The lower end of the handle bar 28 is reduced in diameter, as indicated at 30, and secured in a socket 32, whose lower end is fixed, as indicated at 34, to the center of a relatively rigid saddle 36.

The saddle 36 comprises a preferably sheet metal, elongated rectangular plate 38 which extends the length of and is transversely curved to conform in curvature to that of the tops of the middle and intermediate convolutions 12, 14 and 16, respectively. The saddle plate 38 has formed centrally therein a depressed upwardly opening channel 40, having longitudinally spaced slots 41 which receive the tops of middle convolutions 12, and the intermediate convolutions 14 and 16. A clamping rod 42 extends along the channel 40, and clamps the convolutions against the underside of the saddle plate 38.

The side edges of the saddle plate 38 are provided with downwardly and laterally inwardly extending longitudinal flanges 44, which extend the length of the plate, and are formed, in their free edges with longitudinally spaced notches 46, which receive, retain, and space the tops of the middle and intermediate convolutions. With this arrangement, the middle and intermediate convolutions can, by being pressed to the ground G, with the handle bar 28 held and pressed downwardly at different angles, be spread away from each other in either direction lengthwise of the basket 10, for picking up nuts from the ground, without undue stress on the device, and without danger of disturbing the essential relationship of the basket to the saddle 36.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In a nut gatherer, a basket comprising a longitudinally elongated spring wire spiral having a middle convolution of maximum diameter and intermediate convolution on opposite sides of the middle convolution which diminish progressively in diameter toward the ends of the spiral, the said convolutions being spaced from each other at distances less than the diameter of a nut to be gathered, means embodying convolutions smaller in diameter than the intermediate convolutions on one end of the spiral defining a discharge opening for the basket, and means embodying a conical helix of convolutions smaller in diameter than the intermediate convolutions on the other end of the spiral defining a closed end for the basket.

2. In a nut gatherer, a basket comprising a longitudinally elongated spring wire spiral having a middle convolution of maximum diameter and intermediate convolution on opposite sides of the middle convolution which diminish progressively in diameter toward the ends of the spiral, the said convolutions being spaced from each other at distances less than the diameter of a nut to be gathered, means on one end of the spiral defining a discharge opening for the basket, means embodying a conical helix of convolutions smaller in diameter than the intermediate convolutions on the other end of the spiral defining a closed end for the basket, said opening defining means comprising convolutions smaller in diameter than the intermediate convolutions, and an upstanding handle secured to the tops of said convolutions.

3. In a nut gatherer, a basket comprising a longitudinally elongated spring wire spiral having a middle convolution of maximum diameter and intermediate convolution on opposite sides of the middle convolution which diminish progressively in diameter toward the ends of the spiral, the said convolutions being spaced from each other at distances less than the diameter of a nut to be gathered, means on one end of the spiral defining a discharge opening for the basket, means on the other end of the spiral defining a closed end for the basket, the bottoms of the intermediate convolutions being on progressively higher levels than the bottom of the middle convolution toward the ends of the basket, the tops of the convolutions being on the same level, and an upstanding handle means secured to the tops of said convolutions.

4. In a nut gatherer, a basket comprising a longitudinally elongated spring wire spiral having a middle convolution of maximum diameter and intermediate convolution on opposite sides of the middle convolution which diminish progressively in diameter toward the ends of the spiral, the said convolutions being spaced from each other at distances less than the diameter of a nut to be gathered, means on one end of the spiral defining a discharge opening for the basket, means on the other end of the spiral defining a closed end for the basket, the bottoms of the intermediate convolutions being on progressively higher levels than the bottom of the middle convolution toward the ends of the basket, the tops of the convolutions being on the same level, and an upstanding handle means secured to the tops of said convolutions, said handle means comprising a saddle extending along the top of the cage and secured to the tops of the intermediate and middle convolutions, and a vertical handle bar fixed centrally to and normal to the saddle.

5. In a nut gatherer, a basket comprising a longitudinally elongated spring wire spiral having a middle convolution of maximum diameter and intermediate convolution on opposite sides of the middle convolution which diminish progressively in diameter toward the ends of the spiral, the said convolutions being spaced from each other at distances less than the diameter of a nut to be gathered, means on one end of the spiral defining a discharge opening for the basket, means on the other end of the spiral defining a closed end for the basket, the bottoms of the intermediate convolutions being on progressively higher levels than the bottom of the middle convolution toward the ends of the basket, the tops of the convolutions being on the same level, and an upstanding handle means secured to the tops of said convolutions, said handle means comprising a saddle extending along the top of the cage and secured to the tops of the intermediate and middle convolutions, and a vertical handle bar fixed centrally to and normal to the saddle, said saddle comprising a longitudinally elongated plate having a transverse concave undersurface conformably engaged with the tops of said convolutions, and means connected to the saddle plate and clamping the tops of the convolutions to said concave undersurface.

6. In a nut gatherer, a basket comprising a longitudinally elongated spring wire spiral having a middle convolution of maximum diameter and intermediate convolution on opposite sides of the middle convolution which diminish progressively in diameter toward the ends of the spiral, the said convolutions being spaced from each other at distances less than the diameter of a nut to be gathered, means on one end of the spiral defining a discharge opening for the basket, means on the other end of the spiral defining a closed end for the basket, the bottoms of the intermediate convolutions being on progressively higher levels than the bottom of the middle convolution toward the ends of the basket, the tops of the convolutions being on the same level, and an upstanding handle means secured to the tops of said convolutions, said handle means comprising a saddle extending along the top of the cage and secured to the tops of the intermediate and middle convolutions, and a vertical handle bar fixed centrally to and normal to the saddle, said saddle comprising a longitudinally elongated transversely curved plate having a concave undersurface conformably bearing upon the tops of said convolutions, said plate being formed with a depressed central longitudinal and upwardly opening channel, the channel being formed with longitudinally spaced notches receiving the tops of the convolutions, and a clamping bar extending along the channel and beneath the tops of the convolutions.

7. In a nut gatherer, a basket comprising a longitudinally elongated spring wire spiral having a middle convolution of maximum diameter and intermediate convolution on opposite sides of the middle convolution which diminish progressively in diameter toward the ends of the spiral, the said convolutions being spaced from each other at distances less than the diameter of a nut to be gathered, means on one end of the spiral defining a discharge opening for the basket, means on the other end of the spiral defining a closed end for the basket, the bottoms of the intermediate convolutions being on progressively higher levels than the bottom of the middle convolution toward the ends of the basket, the tops of the convolutions being on the same level, and an upstanding handle means secured to the tops of said convolutions, said handle means comprising a saddle extending along the top of the cage and secured to the tops of the intermediate and middle convolutions, and a vertical handle bar fixed centrally to and normal to the saddle, said saddle comprising a longitudinally elongated transversely curved plate having a concave undersurface conformably bearing upon the tops of said convolutions, said plate being formed with a depressed central longitudinal and upwardly opening channel, the channel being formed with longitudinally spaced notches receiving the tops of the convolutions, and a clamping bar extending along the channel and beneath the tops of the convolutions, said saddle plate having pendant flanges extending along its side edges formed with longitudinal spaced notches retainably receiving and spacing the convolutions.

References Cited in the file of this patent

UNITED STATES PATENTS

| | | |
|---|---|---|
| 721,196 | Jeffreys | Feb. 24, 1903 |
| 2,835,099 | Touchberry | May 20, 1958 |